No. 799,239. PATENTED SEPT. 12, 1905.
S. F. JONES.
TELEGRAPHY.
APPLICATION FILED APR. 19, 1905.
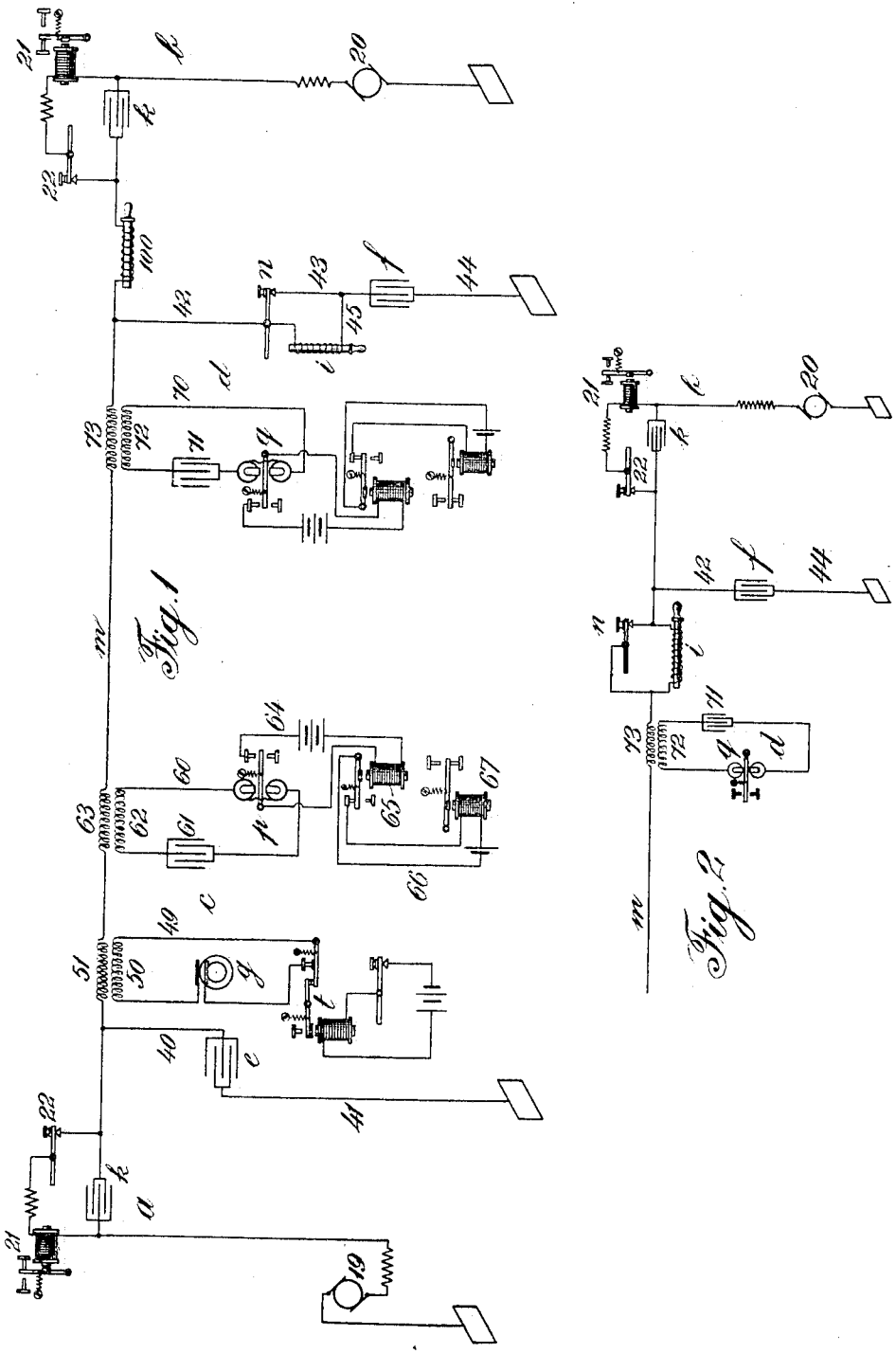

UNITED STATES PATENT OFFICE.

STERNS F. JONES, OF NEW YORK, N. Y., ASSIGNOR OF ONE-HALF TO POSTAL TELEGRAPH-CABLE COMPANY, OF NEW YORK, N. Y., A CORPORATION OF NEW YORK.

TELEGRAPHY.

No. 799,239.     Specification of Letters Patent.     Patented Sept. 12, 1905.

Application filed April 19, 1905. Serial No. 256,352.

*To all whom it may concern:*

Be it known that I, STERNS F. JONES, a citizen of the United States, residing in the borough of Brooklyn, city of New York, county of Kings, State of New York, have made certain new and useful Improvements in Telegraphy, of which the following is a specification.

My invention relates to that class of telegraph apparatus in the operation of which two or more stations exchange signals by means of impulses of continuous current, each impulse being coterminous with an elemental signal, and two or more stations on the same circuit simultaneously exchange signals by means of short and rapid alternations of current divided into groups of varying length and sequence.

The object of my invention is to improve the effectiveness of the signals and the speed of transmission, so that the carrying capacity of the circuit is greatly increased.

My invention consists in employing a telegraph-circuit having means for signaling by continuous-current impulses. This may be a simple Morse circuit, in which the current is made and broken, or the apparatus operating by reversals in polarity of a straight current, or by variations in the amperage of a straight current, or by combinations of the two last-named arrangements, and superposing upon said circuit so equipped an alternating current consisting of short rapidly-recurring impulses. Normally these alternating impulses are on the line, and signals are made by discontinuing or interrupting the circuit in which said impulses are perceptible, such circuit consisting of the main line and branches or by-paths around the straight-current instruments, each branch containing a condenser with separate circuits for the alternating-current instruments inductively connected with the main line.

The accompanying drawings illustrate my invention.

Figure 1 is a complete schematic view of the double transmission arrangement of apparatus in which two normally closed circuits are employed. Fig. 2 is a modification of the arrangement at one station.

$m$ is a telegraph-line extending between the stations $a$ and $b$. In circuit with said line $m$ at each station are machines or other generators 19 20, coöperatively connected.

21 is a Morse relay, and 22 is a key or circuit-breaker, these instruments being duplicated at stations $a$ and $b$, and they are included in a constantly-closed continuous-current circuit.

I provide a second normally closed circuit for separate points or stations $c$ and $d$ to be traversed and energized by alternating current impulses. This circuit consists of the intermediate portion of the telegraph-line $m$ and at station $c$ the main-line fragment 40, connected to one plate of the condenser $e$. The other plate of the condenser is connected to ground or return-conductor by line fragment 41.

At station $d$ the line fragment 42 is connected to the transmitter $n$, shown as a simple Morse key, and through $n$ by conductor 43 to one plate of the condenser $f$. The other plate of the condenser is connected to ground or return-conductor by the wire 44. In a branch circuit 45 I include an inductance $i$. The transmitter $n$ is so connected to the inductance $i$ that when operated the inductance is inserted and withdrawn with respect to the alternating-current circuit.

At station $c$ there is a machine-generator $g$, developing short rapidly-recurring impulses of current alternating in polarity. The generator $g$ is in a branch circuit 49 with one coil 50 of a transformer, the other coil of which, 51, is in the main line $m$. A transmitter $t$, operated by a key and local circuit in the well-known manner, is normally closed and maintains the local or branch circuit 49 normally closed, so that the impulses due to the generator $g$ are continuously effective in the alternating-current circuit which includes the condenser branches 40 and 42.

$p$ is a polarized receiving instrument or relay in a local circuit 60, with a condenser 61 and one coil of a transformer 62, a companion coil 63 being in the line $m$. The relay $p$ operates a local circuit 64, containing a repeating-sounder 65, which operates a local circuit 66, containing a reading-sounder 67.

At station $d$, $q$ is a polarized relay operating the same arrangement of repeating-sounder and reading-sounder last described. The coils of relay $q$ are in a separate or branch circuit 70 with a condenser 71 and one coil of a transformer 72, the other coil of which, 73, is in the main line $m$. Between station $d$ and station $b$ in the main line I include an inductance 100, which is effective to choke or impede the flow of alternating impulses in the main line $m$ between the stations $d$ and $b$. There is a condenser $k$ in a branch circuit bridging the Morse instruments 21 and 22 at each of the stations $a$ and $b$.

In the modification shown in Fig. 2 I have shown the same arrangement of receiving apparatus at the station $d$, and the condenser $f$ has its plates connected to the main line $m$ by conductor 42 and to the ground by conductor 44; but the inductance $i$ is located in the main line and the transmitter $n$ is in a branch connected to the opposite terminals of the inductance $i$, so that when the transmitter $n$ is operated the inductance $i$ is inserted and withdrawn with respect to the alternating-current circuit, as before; but this arrangement affords a means for arranging such a transmitter at an intermediate or way station, while the condenser branch 42 44 is separated or located at the extremity of the alternating-current circuit, which always includes a part or portion of the main line $m$.

The operation of the apparatus is as follows: Signals are exchanged in either direction between the stations $a$ and $b$ in a well-known manner by making and breaking the circuit. Signals are exchanged simultaneously with those last described between the points or stations $c$ and $d$. The generator $g$ is continuously operating, the transmitter $t$ is normally closed, and the impulses from the generator $g$ are normally effective to energize the circuit including the central portion of the conductor $m$, which is completed at station $c$ by the main-line fragment 40, the condenser $e$, and the line fragment 41, connected to the return-conductor, and at station $d$ by the main-line fragment 42, the condenser $f$, the line fragment 44, and the return-conductor. The relays $p$ and $q$ under the influence of the alternations inductively appearing in the separate circuits 60 and 70, respectively, have their armatures carried to a central position between the contact-stops and the local circuit 64 is normally opened, while the circuit of the reading-sounder 67 is normally closed. If now station $d$ desires to communicate with station $c$, the transmitter $n$ is opened and closed to form the conventional code-signal or call, as is well understood. When the transmitter $n$ is opened, the inductance $i$ is introduced in the circuit of the alternating impulses, producing sufficient impedance to reduce the strength of current to a point where the bias of relays $p$ and $q$ carries the armatures to engagement with the closing-point of the local circuits, and the reading-sounders of both relays $p$ and $q$ respond. Station $c$ by operating his transmitter $t$ makes and breaks the separate circuit 49, and station $d$, noticing the interruption, closes his transmitter $n$, receiving the response of the station $c$. Signals are then exchanged and messages received and transmitted to and fro between these stations $c$ and $d$, as indicated.

By the arrangement shown and described I am enabled with a single alternating-current generator located at one station to furnish a plurality of separated stations an alternating-current circuit which is normally closed and to thus furnish means to multiply the capacity of any telegraph-circuit two, three, or more times, according to the number of way-stations accommodated. An intermediate or way station would preferably employ the arrangement shown in the modification Fig. 2, where a separate inductance $i$ is placed in the main line at each intermediate station. I prefer, however, to avoid placing the resistance and inductance $i$ in the main line where it can be avoided, as the presence of such an instrument in the main line affects a circuit employing balanced instruments.

What I claim, and desire to secure by Letters Patent, is—

1. The combination of a telegraph-line, means, at separated stations, for transmitting signals by varying a continuous current and at separated points or stations means for simultaneously transmitting signals by groups of alternating impulses, each group representing an elemental signal, said means consisting of a source of alternating-current impulses and a transmitter for controlling said source, inductively connected with the main line; a suitable receiving instrument at said station, and at a second station a suitable receiving instrument inductively connected with said line and a branch line or circuit including a transmitter, an inductance and a capacity, said transmitter being arranged to insert and withdraw said inductance with respect to said circuit.

2. The combination of a telegraph-line, means for transmitting and receiving signals by varying a continuous current and means for simultaneously transmitting and receiving signals by dividing an alternating current into groups of varying lengths, consisting of a source of alternating-current impulses, a transmitter, and a suitable receiving instrument inductively connected with said line, at one station, and at a second station a suitable receiving instrument, an inductance, a condenser, a branch circuit, and a transmitting device connected to include and exclude said inductance with respect to said main line.

3. The combination of a telegraph-line, means for transmitting and receiving signals by varying a continuous current and means for simultaneously transmitting and receiving signals by dividing an alternating current into groups of varying lengths, consisting of a source of alternating-current impulses, a transmitter and a suitable receiving instrument inductively connected with said line at one station, and at a second station a suitable receiving instrument, an inductance, a condenser, a branch circuit, and a transmitting device connected to include and exclude said inductance with respect to the circuit of the alternating current.

4. The combination of a telegraph-line, means for transmitting and receiving signals by varying a continuous current and means for simultaneously transmitting and receiving signals by dividing alternating-current impulses into groups of varying lengths, consisting of a source of alternating current, a transmitter and a suitable receiving instrument inductively connected with the main line at one station, and at a second station a suitable receiving instrument, an inductance, a branch circuit and a transmitting device connected to said main line and inductance to include and exclude said inductance with respect to the circuit of said source of alternating current.

5. The combination of a telegraph-line, means, at separated stations, for transmitting and receiving signals by varying continuous-current impulses and means at two or more points or stations for transmitting and receiving signals by dividing alternating-current impulses into groups, said means including a source of alternating-current impulses and a suitable receiving instrument inductively connected with the main line, a transmitter arranged to normally direct the current of said source onto said main line, condenser branches at extreme points connected with the main circuit and completing the alternating-current circuit, a receiving instrument at a second point or station inductively connected with the main line, an inductance in the alternating-current circuit at said station and a transmitter connected to the terminals of said inductance.

6. The combination of a telegraph-line, a source of short, rapidly-recurring alternating impulses of current, a branch or local circuit therefor and a suitable receiving instrument inductively connected with said line at one station, and at a second point or station a condenser connected to the main line and ground or return-circuit, an inductance and a transmitter in circuit with said condenser, said transmitter being arranged to insert and withdraw said inductance with respect to said circuit.

STERNS F. JONES.

Witnesses:
   HENRY G. FRITSCHE,
   A. M. DONLEVY.